Oct. 5, 1965    W. P. CROPPER ETAL    3,210,541
APPARATUS FOR X-RAY DETERMINATION OF METAL IN HYDROCARBON FUEL
Filed Oct. 7, 1960    2 Sheets-Sheet 1
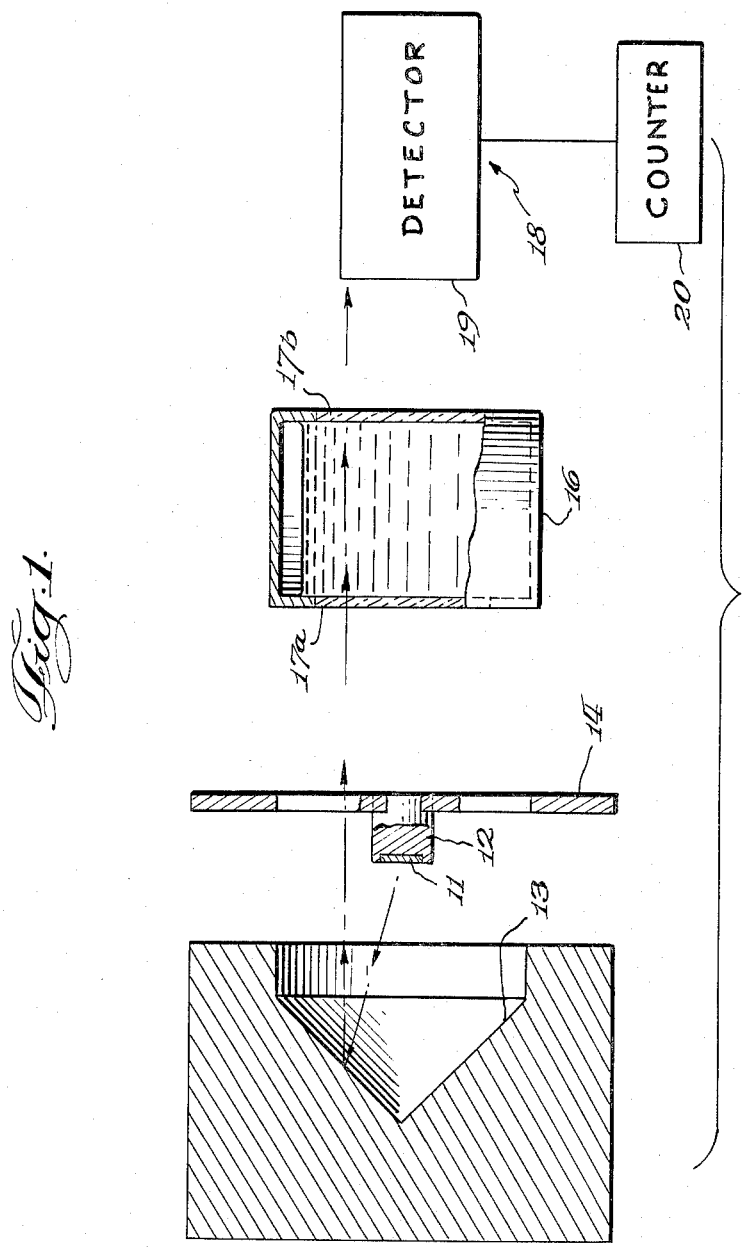
INVENTORS.
Wendell P. Cropper
Thomas L. Thourson
By Douglas G. Bra_
Attorney.

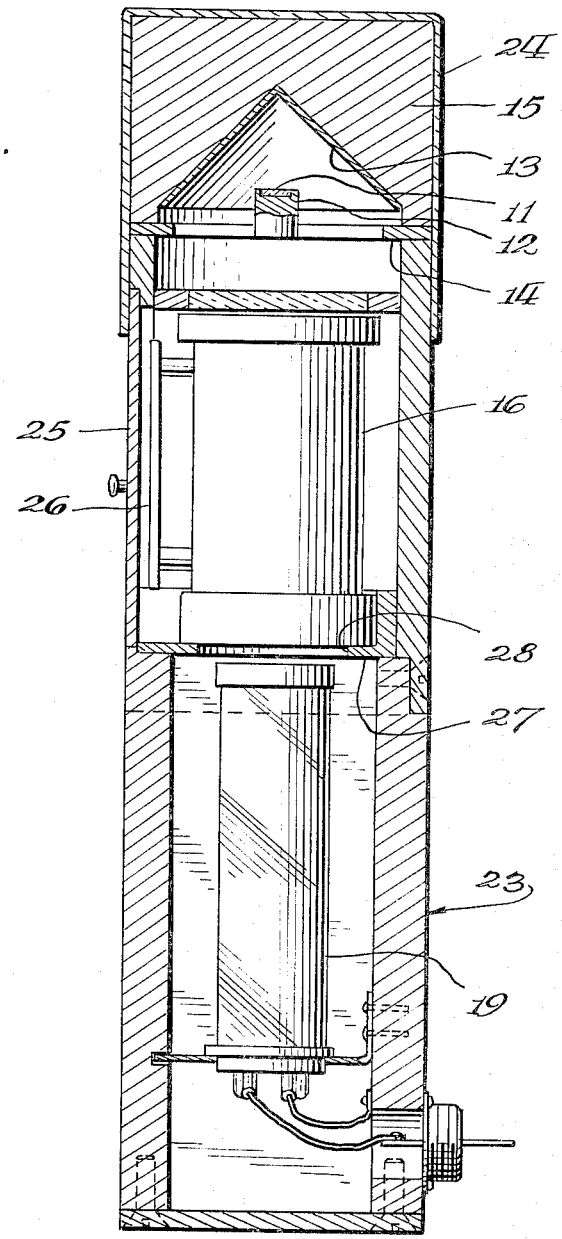

United States Patent Office 3,210,541
Patented Oct. 5, 1965

3,210,541
APPARATUS FOR X-RAY DETERMINATION OF METAL IN HYDROCARBON FUEL
Wendell P. Cropper, Lansing, and Thomas L. Thourson, Arlington Heights, Ill., assignors to Standard Oil Company, Chicago, Ill., a corporation of Indiana
Filed Oct. 7, 1960, Ser. No. 61,287
6 Claims. (Cl. 250—43.5)

This invention relates to an improved apparatus for determining the concentration of lead in a hydrocarbon fuel by radiation absorption.

The determination of the concentration of lead, particularly in the form of an alkyl lead compound, such as tetraethyl lead, is important in petroleum refining operations, particularly the blending and testing of motor and aviation gasolines. Wet chemical and other analytical techniques have been devised for the purpose of determining the concentration of lead in hydrocarbon fuels, but such techniques are generally either too expensive or time consuming or insufficiently accurate.

U.S. Patents Nos. 2,937,726 and 2,937,275, which matured out of applications by, respectively, T. L. Thourson, one of the applicants herein, and T. L. Thourson and A. T. Wilson, disclose methods and apparatus for determining the concentration of lead in a hydrocarbon using X-ray absorption techniques. However, it has been found that, even with the improved apparatus of such patents, the determination of lead concentration is undesirably sensitive to the hydrogen/carbon ratio of the hydrocarbon under test.

Accordingly, it is an object of this invention to provide an apparatus for determining the concentration of lead in the hydrocarbons in which the sensitivity of the determination to the hydrogen concentration in the hydrocarbons is substantially negligible. Other objects of the invention will become apparent in the course of the detailed description thereof.

The apparatus of the invention comprises a radioactive beta ray source, an absorber adapted for absorbing radiant energy, a reflecting target, hydrocarbon sample cell means, and X-ray detecting means. The reflecting target comprises molybdenum adapted for receiving beta rays from the source and adapted for emitting X-rays from the same surface of the target upon which the beta rays from the source are received.

The radioactive beta ray source is disposed between the reflecting target and the absorber. The absorber is so shaped and disposed to substantially completely absorb all radiant energy from the source other than radiant energy receivable upon the reflecting target. The hydrocarbon sample cell means are disposed to receive X-rays emitted from the target. The X-ray detecting means are disposed to receive X-rays which pass through the hydrocarbon sample cell means.

A particular embodiment of the apparatus of the invention is set out in the annexed figures, which figures form a part of the specification.

FIGURE I shows a schematic diagram of the principal elements of the apparatus. FIGURE II shows a cutaway plan view of the apparatus as assembled in a housing adapted therefor. The invention is described in detail in connection with the embodiment shown in the figures.

Referring now to FIGURE I, a radioactive beta ray source 11 is positioned between absorber 12 and target 13. Radioactive beta ray source 11 may be any source which has a continuous beta ray spectrum. It is preferably strontium 90, and may be in the form of the pure radio isotope or in the form of a compound thereof, such as a carbonate or sulfate. The strength of the radioactive beta ray source should be in the range of between about 10 to about 1000 millicuries, preferably in the range of between about 50 to 200 millicuries. The radioactive source may be contained in a sealed wafer or capsule formed from silver foil or stiff paper.

Absorber 12 is so shaped and disposed to intercept all radiant energy from radioactive source 11 except such energy which is receivable upon target 13. It is essential that absorber 12 prevent the passage of radiant energy from radioactive source 11 to the hydrocarbon sample tested. Interception by the absorber of energy from radioactive source 11, other than that which would otherwise pass to the sample under test and energy receivable upon target 13, is not essential, but is preferable from the standpoint of safety. Absorber 12 is preferably a metal of relatively high density, such as lead, steel, copper or brass. The absorber should be designed to absorb substantially all, e.g., about 99.8–99.9 percent, of the radiant energy which it receives from radioactive source 11.

In FIGURE I, absorber 12 is mounted on a spider 14. The spider is shaped like a steering wheel having two or three spokes, and is for the purpose of positioning absorber 12 relative to the other elements of the apparatus. Alternative means for positioning absorber 12 may be used.

Target 13 comprises molybdenum with a recessed conical surface disposed to receive beta rays from source 11. Alternatively, the recessed surface may be parabolic or in the shape of a V. In a further alternative the surface of molybdenum target 13 disposed to receive beta rays from source 11 need not be recessed but may be flat.

In a preferred embodiment, described hereinafter, target 13 is a molybdenum foil having a thickness of at least about 0.001 inch and backed with a backing block. When no backing block is used, molybdenum target 13 is preferably made thick enough to prevent the passage of radiant energy through it. Generally a thickness of about at least $\frac{1}{25}$ of an inch will be sufficient.

The hydrocarbon sample undergoing test is disposed in sample cell means 16. Sample cell means 16 may be made of any convenient material which is inert to the hydrocarbon sample. However, the sample cell means should be provided with sample cell windows 17A and 17B which are adapted to pass X-rays with a minimum of absorption thereof. Windows 17A and 17B may be suitably made of Mylar or very thin aluminum, both of which have relatively low X-ray absorption characteristics.

The absorption path traversed by the X-rays from target 13 through the hydrocarbon in sample cell means 16 should be uniform. Such absorption path may be expressed as grams of hydrocarbon sample per square centimeter of surface exposed to radiation, and as so expressed should be in the range of between about one and six, preferably about three to four, when using a radioactive source having about 50 to 100 millicuries of radiation. By way of illustration using a gasoline having a specific gravity of 0.778 (50° API), the distance through the gasoline traversed by the X-rays would be preferably in the range of between about four to five centimeters. X-ray detecting means 18 comprises a suitable detector means 19, such as a Geiger-Mueller tube, to which is connected a conventional counting means 20. Detector means 19 is disposed so as to receive only radiation from target 13 which has passed through hydrocarbon cell means 16. The number of X-rays received per unit of time by detector 19 is correlatable with the concentration of lead in the hydrocarbon under test. A new correlation curve should be determined experimentally whenever a new radioactive source 11 is used.

Broken line 21A depicts the path of a beta ray emitted from radioactive source 11 as it travels to target 13. Broken line 22A depicts an X-ray emitted from the surface of target 13 as a result of a beta ray striking thereon. Line 22B is an extension of 22A and shows the path of an X-ray after it has passed through the hydrocarbon in sample cell means 16 and is about to be received by detector 19. Although over the distances involved in the apparatus of this invention, beta rays and X-rays travel in a straight line, the angle formed by path 21A of a beta ray striking target 13 and the path 22A of an X-ray emitted therefrom as a result of such a beta ray does not necessarily follow the laws relating to the angle of incidence and reflection of light.

FIGURE II illustrates an embodiment of this invention assembled in a suitable housing 23. Radioactive source 11 is disposed in a recess in absorber 12 which is mounted on and positioned by spider 14.

Target 13 is a molybdenum foil conically shaped and affixed to backing block 15. Backing block 15 is for the purpose of intercepting any radiant energy which might pass through target 13 or be emitted from that surface of target 13 which is opposite radioactive source 11. Backing block 15 may also serve as support for target 13. Target 13 may be attached to backing block 15 with screws, or with adhesive, or it may be mechanically rolled into backing block 15. Backing block 15 is preferably made of a metal having a relatively high density, such as lead, steel, copper, brass or zinc, and should be of such thickness to prevent the passage of radiant energy through it. The combination of radioactive source 11, absorber 12, spider 14, reflecting target 13, and backing block 15 may be integrally assembled within cap 24 to facilitate the removal thereof from housing 23 without removal therefrom of other elements of the apparatus.

Hydrocarbon sample cell means 16 is positioned between reflecting target 13 and detector 19, and is removable through door 25. Sample cell means 16 is provided with handle 26 for the purpose of moving it. Sample cell means 16 is provided with a sample cell window (not shown) in the base thereof and may be provided with a sample cell window at the top thereof. Alternatively sample cell means 16 may have an open top, rather than being enclosed.

Detector 19 is positioned to receive X-rays which have passed through sample cell means 16. The support 27 on which the base of sample cell means 16 rests is provided with a ported opening 28 permitting passage of X-rays from sample cell means 16 to detector 19. Detector 19 as shown is a Geiger-Mueller tube which is connected to conventional counting equipment not shown and a source of electrical energy.

The successful results obtained by using the apparatus of this invention are illustrated by the data set forth below. These data show the relative intensities of radiation transmitted through samples of pure hydrocarbons of differing hydrogen concentrations. The intensities given are relative to the intensity of radiation transmitted through pure isooctane, which is taken as unity.

The reflecting target apparatus used embodies the invention herein claimed. The transmission-type target apparatus used was similar to that described in the above-mention U.S. Patent No. 2,937,275. In each device, the target comprised molybdenum foil of 0.001 inch thickness; the radioactive source was strontium 90; the hydrocarbon sample cell size was 3.6 grams of hydrocarbon per square centimeter of exposed area; and the detector was a krypton-filed Geiger-Mueller tube.

Table

| Sample | Hydrogen concentration, weight percent | Relative radiation transmitted | |
|---|---|---|---|
| | | Reflecting-type target | Transmission-type target |
| Iso-octane | 15.8 | 1.00±0.01 | 1.000±0.003 |
| Toluene | 8.7 | 1.00±0.01 | 1.034±0.003 |
| Benzene | 7.7 | 1.00±0.01 | 1.038±0.003 |

The foregoing data show that with a device using a transmission-type target there is a definite variation in the relative intensity in the radiation transmitted through a hydrocarbon sample depending upon the concentration of hydrogen therein. The data further show that, using the apparatus of this invention, the variation in intensity of radiation transmitted is substantially independent from the hydrogen concentration in the sample.

Having thus described the invention, we claim:

1. An apparatus comprising a radioactive beta ray source, an absorber adapted for absorbing radiant energy, a reflecting target, said target comprising molybdenum adapted for receiving beta rays from said source and emitting X-rays from the same surface of said reflecting target upon which said beta rays are received, hydrocarbon sample cell means and X-ray detecting means, said source being disposed between said reflecting target and said absorber, said absorber being shaped and disposed to substantially completely absorb all radiant energy from said source other than radiant energy receivable upon said reflecting target, said sample cell means being disposed to receive X-rays emitted from said target and said X-ray detecting means being disposed to receive X-rays which pass through said sample cell means.

2. The apparatus of claim 1 wherein said reflecting target is backed with a lead shield.

3. The apparatus of claim 1 wherein said beta ray source comprises strontium 90.

4. The apparatus of claim 1 wherein said reflecting target is conically shaped.

5. The apparatus of claim 1 wherein said source and said absorber are disposed between said reflecting target and said sample cell means.

6. In an apparatus for determining the concentration of lead in a hydrocarbon fuel, which apparatus comprises a radioactive beta ray source, a metallic foil target adapted for receiving beta rays from said source and emitting X-rays from the surface of said foil opposite the surface upon which said beta rays are received, hydrocarbon sample cell means and X-ray detecting means, said X-ray detecting means being positioned to receive X-rays which pass through said sample cell means, the improvement which comprises using a reflecting molybdenum foil target adapted for receiving beta rays from said source and emitting X-rays from the same surface of said reflecting target upon which said beta rays are received, and an absorber adapted for absorbing radiant energy, said source being disposed between said reflecting target and said absorber, said sample cell means being disposed to receive said X-rays emitted from said target and said absorber being shaped and disposed to substantially completely absorb all radiant energy from said source other than energy receivable upon said reflecting target.

References Cited by the Examiner
UNITED STATES PATENTS

| 2,629,831 | 2/53 | Atchley | 250—83.4 |
| 2,933,606 | 4/60 | Foster et al. | 250—83.4 |
| 2,937,275 | 5/60 | Thourson et al. | 250—43.5 |
| 2,937,276 | 5/60 | Thourson | 250—43.5 |

OTHER REFERENCES

"Beta Ray Excited Low-Energy X-Ray Sources," by Reiffel, Nucleonics, vol. 13, No. 3, March 1955, pages 22 to 24.

RALPH G. NILSON, *Primary Examiner.*